US007058643B2

(12) United States Patent
Vailaya (10) Patent No.: US 7,058,643 B2
(45) Date of Patent: Jun. 6, 2006

(54) SYSTEM, TOOLS AND METHODS TO FACILITATE IDENTIFICATION AND ORGANIZATION OF NEW INFORMATION BASED ON CONTEXT OF USER'S EXISTING INFORMATION

(75) Inventor: Aditya Vailaya, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 303 days.

(21) Appl. No.: 10/155,304

(22) Filed: May 22, 2002

(65) Prior Publication Data

US 2003/0220895 A1 Nov. 27, 2003

(51) Int. Cl.
*G06F 17/30* (2006.01)
(52) U.S. Cl. .............................. 707/101; 707/4; 707/5
(58) Field of Classification Search ................ 707/100, 707/101, 5, 4
See application file for complete search history.

(56) References Cited

U.S. PATENT DOCUMENTS

| 6,076,088 | A | * | 6/2000 | Paik et al. .................... 707/5 |
| 6,240,412 | B1 | * | 5/2001 | Dyko et al. .................... 707/5 |
| 6,263,335 | B1 | * | 7/2001 | Paik et al. .................... 707/5 |
| 6,457,017 | B1 | * | 9/2002 | Watkins et al. ......... 707/103 R |
| 6,457,028 | B1 | * | 9/2002 | Pitkow et al. .............. 715/513 |
| 6,496,832 | B1 | | 12/2002 | Chi et al. |
| 6,539,396 | B1 | * | 3/2003 | Bowman-Amuah ..... 707/103 R |
| 6,542,896 | B1 | * | 4/2003 | Gruenwald .................. 707/101 |
| 6,738,780 | B1 | * | 5/2004 | Bollacker et al. ........... 707/101 |
| 6,799,176 | B1 | * | 9/2004 | Page .............................. 707/5 |
| 2002/0178184 | A1 | | 11/2002 | Kuchinsky et al. |

FOREIGN PATENT DOCUMENTS

| EP | EP 1170677 A2 | 5/2001 |
| EP | EP 1 170 677 A2 | 9/2002 |
| WO | WO 00/67159 | 5/2000 |
| WO | WO 00/67159 | 11/2000 |

OTHER PUBLICATIONS

U.S. Appl. No. 10/642,376, filed Aug. 14, 2003, pending.
U.S. Appl. No. 10/641,492, filed Aug. 14, 2003, pending.
U.S. Appl. No. 10/155,405, filed May 22, 2002, pending.
U.S. Appl. No. 10/154,524, filed May 22, 2002, pending.
U.S. Appl. No. 10/555,616, filed May 22, 2002, pending.
U.S. Appl. No. 10/033,823, filed Dec. 19, 2001, pending.

(Continued)

*Primary Examiner*—Greta Robinson (57) ABSTRACT

A user's context can be captured in terms of experimental results and other locally collected data. The use of extracted links between imported scientific text, biological models or experimental data, and proprietary or public data to provide relevance ranking, filtering, and categorization of imported scientific text or biological models, based upon their linking with the local data is described.

52 Claims, 2 Drawing Sheets

OTHER PUBLICATIONS

U.S. Appl. No. 10/154,529, filed May 22, 2002, pending.
U.S. Appl. No. 10/155,675, filed May 22, 2002, pending.
Biomolecular Interaction Network Database. [online] [retrieved May 22, 2002] Retrieved from the internet: <URL:http:www.bind.ca/index.phtml?page=databases>.
"The Signaling Pathway Database (SPAD) is an integrated database for generic information and signal transduction system" [online] [retrieved May 22, 2002] Retrieved from the Sigaling Pathway Database using the Internet: <URL:http://www.grt.kyushu-u.ac.jp/spad>.
Transpath Signal Transduction Browser [online] [retrieved May 22, 2002] Retrieved from the Transpath Home Page using the Internet: <URL:http://www.transpath.gbf.de/>.
The Transcription Factor Database [online] [retrieved May 22, 2002] Retrieved the Internet: <URL:http://transfac.gbf.de/transfac>.
Kyoto Encyclopedia of Genes and Genomes [online] [retrieved May 22, 2002] Retrieved from the Internet: <URL:http://www.kegg.com>.
Patent Full Text and Full Page Image Database [online] [retrieved May 22, 2002] Retrieved from the United States Patent and Trademark Office website using the Internet: <URL:http://uspto.gov/patft>.
OMIM: Online Mendelian Inheritancein Man [Online] [retrieved May 22, 2002] Retrieved from the National Center for Biotechnology Information website using the Internet: <URL:http://www.ncbi.nlm.nlh.gov/omim>.
PubMed [online] [retrieved May 22, 2002] Retrieved from NCBI, National Library of Medicine using the Internet: <URL:http://www.nim.nih.gov/entraz/quer.fcqi>.
NEC Research Index [online] [retrieved May 22, 2002] Retrieved from the Internet: <URL:http://www.citeseer.nl.nec.com/>.
GOOGLE [online] [retrieved May 22, 2002] Retrieved from the Internet: <URL:http://www.google.com>.
Krishna Bharat, "Search Pad: explicit capture search context to support Web Search", Computer Networks, Elsevier Science Publishers B. V., Amsterdam, NL; vol. 33, No. 1-6, Jun. 2000; pp. 493-501.
W. Li et al., "PowerBookmarks: a system for personalizable Wen information organization, sharing and management", Computer Networks, Elsevier Science Publishers B.V., Amsterdam, NL; vol. 31, No. 11-16, May 17, 1999; pp. 1375-1389.
W. Fujibuchi et al., DBGET/LINKDB: an integrted proceedings of the Pacific Symposium on Biocomputing, 1998, pp. 683-694.
C. Kaplan et al., "Adaptive Hypertext Navigation Based on User Goals and Context", User Modeling and User-Adapted Interaction, Dordrecht, NL, vol. 3, No. 3, 1993, pp. 193-220.
M. Kaszkiel et al., "Efficient Passage Ranking for Document Databases", ACM Transactions on Systems, Association for Computing Machinery, New York, US; vol. 17, No. 4, Oct. 1999, pp. 406-439.
Bharat K., "SearchPad: explicit capture of search context to support Web search," Computer Networks vol. 33, No. 1-6, 2000, pp. 493-501.
Fujibuchi W. et al., "BDGET/LinkDB: An Integrated Database Retrieval System," Proceedings of the Pacific Symposium on Biocomputing, 1998, pp. 683-694.
Kaszkiel M. et al., "Efficient Passage Ranking for Document Databases," ACM Transactions on Information systems, vol. 17, No. 4, Oct. 1999, pp. 406-439.
Kaplan C. et al., "Adaptive Hypertext Navigation Based on User Goals and Context," User Modeling and User-adapted Interaction vol. 3, No. 3, 1993, pp. 193-220.
Li Wen-Syan et al., "PowerBookmarks: a System for Personalizable Web Information Organization, sharing, and Management," Computer Networks vol. 31, 1999, No. 11-16, pp. 1375-1389.

* cited by examiner

FIG. 1A

SYSTEM, TOOLS AND METHODS TO FACILITATE IDENTIFICATION AND ORGANIZATION OF NEW INFORMATION BASED ON CONTEXT OF USER'S EXISTING INFORMATION

FIELD OF THE INVENTION

The present invention pertains to software systems supporting data gathering and interpretation, and particularly those that can effectively capture the context of a user query.

BACKGROUND OF THE INVENTION

The advent of new experimental technologies that support molecular biology research have resulted in an explosion of data and a rapidly increasing diversity of biological measurement data types. Examples of such biological measurement types include gene expression from DNA microarray or Taqman experiments, protein identification from mass spectrometry or gel electrophoresis, cell localization information from flow cytometry, phenotype information from clinical data or knockout experiments, genotype information from association studies and DNA microarray experiments, etc. This data is rapidly changing. New technologies frequently generate new types of data.

High-throughput techniques are generating huge amounts of biological data which are readily available, but which must still be interpreted. Experiments that measure thousands of genes and proteins (microarray, imminent protein-array technologies, etc.) simultaneously and under different conditions are becoming the norm in both academia and pharmaceutical/biotech companies. A large number of these experiments are conducted in an attempt to solve a piece of the puzzle, that of understanding biological processes. Biologists are in need of tools that help them establish relationships between these heterogeneous data, and extract, build and verify interpretations and hypotheses about these data.

In addition to data from their own experiments, biologists also utilize a rich body of available information from internet-based sources, e.g. genomic and proteomic databases, and from the scientific literature. The structure and content of these sources is also rapidly evolving. The software tools used by molecular biologists need to gracefully accommodate new and rapidly changing data types.

Scientific text (publications, reports, interpretations, patents, etc.) and biological models (pathway diagrams, protein-protein interaction maps, etc.) are great repositories of information related to the current understanding of the functioning of biological processes. With the high-throughput experiments and their results that scientists have to deal with, there is a need to identify information about entities (genes, proteins, molecules, diseases, drugs, etc.) of interest from the vast literature and existing biological models, and be able to verify/validate these using proprietary experimental results.

A number of literature (e.g., Pubmed, Google-Citeseer, OMIM, USPTO Patent database) and biological model (e.g., KEGG, TRANSFAC, TRANSPATH, SPAD, BIND, etc.) databases have been developed (both public domain and proprietary) that allow users to query and download scientific articles and biological models of interest. However, these databases cannot effectively capture the context of a user query.

For example, search results returned by a literature database are based on the occurrence of keywords provided by the user as search terms, and these search terms are limited in their ability to capture the exact information the user is searching for. Therefore, results returned by these search engines can be very broad and users are left to sift through all the text in the returned results to extract information of interest. In other words, the actual content in the text is not understood, and the onus is on the user to manually read the abstract and judge relevance of the search results. It is clearly not possible to capture any arbitrary user query's context on the server side, i.e., at the central database server.

Since only the user knows the context of the query, it would be useful to provide tools to the user to query these databases and extract information that is contextually relevant. Presently, there do not exist tools that enable the user to do so. In fact, most databases are centralized services and base relevance judgments on the data provided by the user (in terms of the search terms, interaction with the database, etc.).

SUMMARY OF THE INVENTION

The proposed invention uses local context to facilitate ranking, filtering, selectively-browsing, and categorization of search results from databases including textual databases, biological model databases and experimental data databases. A relevance score, to rank the results or filter them, can be computed as a function of the amount of overlap between experimental data (or other locally collected data) and textual data (or biological models, or other experimental data), or presented as visualizations for a manual relevance assignment.

The present invention allows users to judge relevance of text or experimental data based on the visual comparisons of their interpretations. Opposing and supporting interpretations can be differentially overlaid on the text, model or other experimental data to draw attention and for easier comparison. Manual inspection and/or semi-automated procedures can allow assignment of trust/confidence to text, models and experimental data.

A method of facilitating identification and organization of new information that is relevant to the context of a user's locally stored information is provided to include extracting relevant data from a first data set; converting the relevant data from the first data set to a local format; linking the relevant data in the local format with locally formatted data from a second, locally stored data set which matches the relevant data; and comparing data from the first data set that is relevant to the locally stored data set, based on links set up by the linking of data in the local format.

Ranking the relevancy of the data can be performed on a whole document text basis and or on a basis of paragraphs or portions within documents. Similarly, parts or all (or both) of models or experimental data sets may be ranked. Ranking is done with regard to the number of links established between the local formatting of the data and the user's local data.

Filtering of data (text, models or experiments) may be performed by identifying a subset of the user's locally formatted data; linking the relevant data in the local format with subset of the locally formatted user's data which matches the locally formatted relevant data; and filtering the data based on the links formed thereby. Only those data that pass the filter are then presented to the user.

Categorizing may be performed by defining multiple subsets of the locally formatted user's data and assigning a bucket to each subset; linking the relevant data in the local format with each of the subsets of the locally formatted user's data which matches the locally formatted relevant data; and categorizing the data based on the links formed thereby, wherein portions of the data having links to a particular subset of the locally formatted user's data are categorized in the bucket which corresponds to that subset, respectively.

A method of identifying and organizing new information that is relevant to the context of a user's locally stored information is described to include retrieving data resultant from a query of one or more databases; mining the data to extract relevant data (mining may be based on terms of the query, a lexicon of nouns and verbs, a combination of these, or the like, for example); converting the relevant data from the first data set to a local format; linking the relevant data in the local format with locally formatted data from a local data set which matches the locally formatted relevant data; and ranking the data based on the number of links established between the locally formatted relevant data and the locally formatted local data. Filtering and/or categorizing may be performed in addition thereto or in lieu thereof. Selective browsing of the results may also be performed, as well as overlaying.

A system for identifying data relevant to the context of a user's local data is described to include means for retrieving data resultant from a query of at least one scientific text database or biological model database; means for mining the data to extract relevant data; means for converting the relevant data from the first data set to a local format; means for linking the relevant data in the local format with locally formatted data from a local data set which matches the locally formatted relevant data; and means for organizing the relevancy of the data based on the number of links established between the locally formatted relevant data and the locally formatted local data.

An application for ranking data retrieved from one or more scientific text databases or biological model databases is described to include means for converting relevant data extracted from the data to a local format; means for linking the locally formatted relevant data with locally formatted local data of a user of the application; and means for ranking the relevancy of the data based on the number of links established between the locally formatted relevant data and the locally formatted local data.

An application for filtering data retrieved from one or more scientific text databases or biological model databases is described to include means for converting relevant data extracted from the data to a local format; means for linking the locally formatted relevant data with a subset of locally formatted local data of a user of the application; and means for filtering the data based on the number of links established between the locally formatted relevant data and the subset of the locally formatted local data.

An application for categorizing data retrieved from one or more scientific text databases or biological model databases is described to include means for converting relevant data extracted from the data to a local format; means for linking the locally formatted relevant data with subsets of locally formatted local data of a user of the application; and means for categorizing the data based on the number of links established between the locally formatted relevant data and each of the subsets of the locally formatted local data.

A computer readable medium carrying one or more sequences of instructions from a user of a computer system for identifying data relevant to the context of a user's local data is described, wherein the execution of the one or more sequences of instructions by one or more processors cause the one or more processors to perform the steps of converting relevant data extracted from the data to a local format; linking the locally formatted relevant data with locally formatted local data of the user which matches the locally formatted relevant data; and organizing the relevancy of the data based on the number of links established between the locally formatted relevant data and the locally formatted local data.

The execution may perform ranking of the data; filtering of the data and/or categorizing of the data. Further steps may include selectively browsing the organized data; mining the data to extract the relevant data; retrieving the data as a result of a query of at least one scientific text database or biological model database; and/or overlaying at least a portion of the locally stored data on at least a portion of the data, or vice versa.

These and other objects, advantages, and features of the invention will become apparent to those persons skilled in the art upon reading the details of the system, applications methods and recordable medium as more fully described below.

DETAILED DESCRIPTION OF PREFERRED EMBODIMENTS

Before the present system, tools and methods are described, it is to be understood that this invention is not limited to particular data sets, commands or steps described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a data set" includes a plurality of such data sets and reference to "the processor" includes reference to one or more processors and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DEFINITIONS

An "entity" is defined herein as a subject of interest that a researcher is endeavoring to learn more about. For example, an entity may be a gene, protein, molecule, disease, drug or other compound, but is not limited to these specific examples.

A "noun" as used herein, refers to an entity. Thus, when data is converted to a local format according to the present invention, entities are selected as the "nouns" for the local format to build a grammar, language or Boolean logic.

A "verb" as used herein, refers to a relationship or action that occurs between nouns. Verbs are also identified for use in the local format to construct a grammar, language or Boolean logic. Examples of verbs include upregulation, downregulation, promotion, inhibition, bind, cleave and status of genes, protein-protein interactions, drug actions and reactions, etc.

Scientific text (publications, reports, interpretations, patents, etc.) and biological models (pathway diagrams, gene networks, metabolic pathways, signal transduction pathways, protein-protein interaction maps, interactions between compounds, molecules or drugs, etc.) are great repositories of information related to the current understanding of the functioning of biological processes. With the high-throughput experiments and their results that scientists have to deal with, there is a need to identify information about entities (i.e., genes, proteins, molecules, diseases, drugs, etc.) of interest from the vast literature and existing biological models, and be able to verify/validate these using proprietary experimental results. Although a number of literature databases and biological model databases have been developed (both public domain and proprietary) that allow users to query and download scientific articles and biological models of interest, they do not effectively capture the context of a user query, nor do they allow the user to relate locally generated information (e.g., experimental data) with relevant documents (or portions of documents) which have been downloaded from these sources.

Textual form scientific documents, as well as diagrammatic form documents containing one or more biological models may be dependent upon or related to many different cellular processes, genes, and various expressions of genes with resultant variations in protein abundance. Correlation and testing of data against these documents is becoming increasingly more tedious and lengthy with the increased automation of the ways in which gene expression, protein expression, and other data is generated (e.g., microarrays, RT-PCR, mass spectroscopy, 2-D Gels, etc.), and with the consequent increasing complexity and number of the documents that describe this data.

The present invention allows a user's context to be captured in terms of experimental results and other locally collected data. The invention makes use of manually, semi-automatically or automatically extracted links between imported scientific text or biological models and proprietary or public data to provide relevance ranking, filtering, and categorization of imported scientific text or biological models.

Thus, a search may be performed on a scientific text or biological model database using a search engine provided for that database, or other search engine, such as one disclosed in co-pending and commonly assigned U.S. application Ser. No. 10/033,823, filed Dec. 19, 2001 and titled "Domain Specific Knowledge-Based Metasearch System and Methods of Using", which is incorporated herein in its entirety, by reference thereto. Further examples of knowledge discovery and data mining tools can be found in co-owned, co-pending application Ser. No. 10/154,529, filed May 22, 2002 and titled "Biotechnology Information Naming Systems", which is incorporated herein, in its entirety, by reference thereto. The search is generally performed, using a client query that is fairly broad. Since this type of search cannot capture the context of a query, if the query is not broad there is a good chance that documents containing useful information will be missed. Therefore, the query of such a database must be fairly broad to be effective.

The results received from such a query are generally quite voluminous. For example, it is not unusual for a typical query of a scientific text database to return thousands of documents. Still further, any or all of these documents can be lengthy in and of themselves, and a large portion of any particular document may not pertain or be relevant to the context of the user's search. Without the present invention, the user is then left to read or browse the entirety of this mass of retrieved documents in an attempt to find the actual relevant data within them. Although the system in U.S. application Ser. No. 10/033,823 can rank, cluster and/or categorize textual documents retrieved by such a search, any of these functions is based upon the initial query performed and the contents of the retrieved documents alone, and not the context of the user's data. Thus, although these functions can be helpful, they only organize the retrieved documents with respect to one another, with no consideration of the user's material on the client side.

Using the present invention, context can be captured in terms of experimental results and other locally collected data. The present system allows a user to manually, semi-automatically or automatically extract links between imported scientific text/biological models and proprietary/public data, as well as experimental data. The links can be used according to the present invention to provide relevance ranking, categorization and filtering of scientific text/biological models retrieved from a generalized search procedure described above.

Figure 1A:
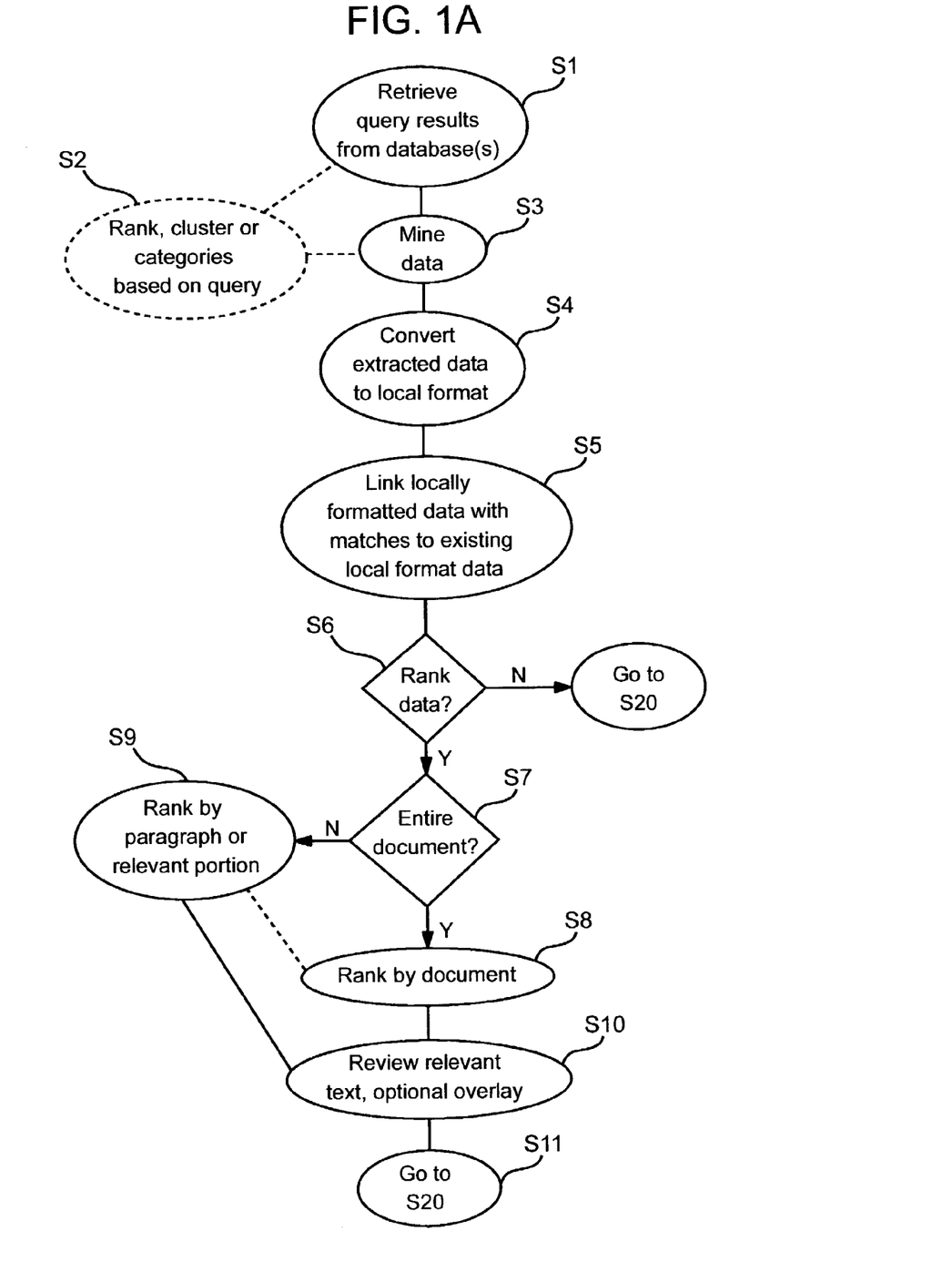
FIGS. 1A–1B show a flowchart showing processing of scientific textual documents retrieved from performing a query on one or more scientific text databases.
Figure 1B:
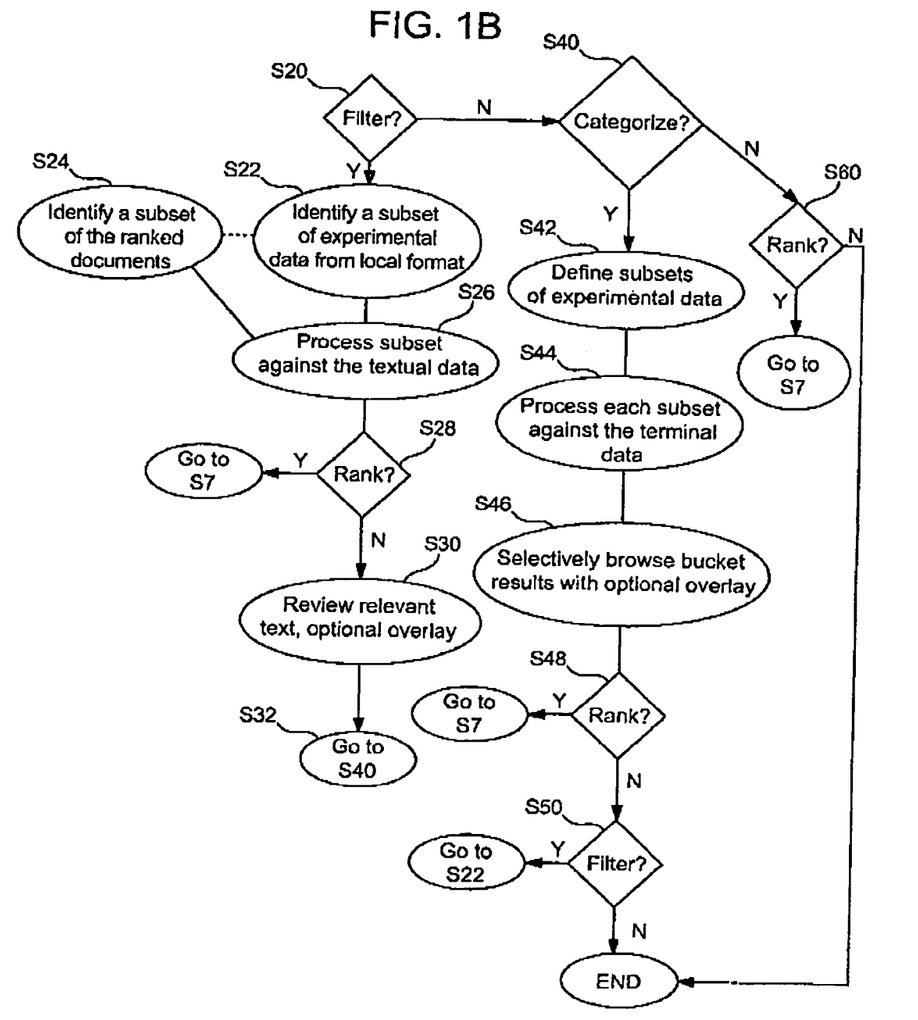

FIGS. 1A–1B show a flowchart showing processing of scientific textual documents retrieved from performing a query on one or more scientific text databases. However, as will be noted below, substantially the same processing may be performed on biological models or other existing experimental data sets that the user may want to compare with his experimental or other locally stored data. In step S1, scientific text documents which are identified by a query of one or more databases are downloaded or retrieved to the client side workstation for further processing. Alternatively, text documents may be loaded from an internal source such as a diskette, hard drive or other storage medium, or the data may be manually input by the user, for example. As noted above, the documents that are retrieved by a search of a database are typically those that match one or more words in the query that was submitted to the one or more databases. As also noted above, the search engine application may also have some capability of data mining, as in the case of the disclosure in U.S. application Ser. No. 10/033,823, and when using such a tool, the user may optionally wish to rank, cluster or categorize the retrieved documents based upon the query terms, wherein any such organization is based upon the documents identified in the query results and the contents of the retrieved documents alone, and not on the context of the user's information. This may be helpful if the user gets a good result from such an operation, in making a first cut of information that is less relevant. However, it is not necessary, as the further processing described below will more accurately tailor the relevancy of the textual documents to the user's particular information.

Therefore, step S2 is optional. Not only is step S2 not necessary, but it also runs the risk of eliminating text that may be more relevant to the context of the user's search than can be identified by the tools based upon the query terms and the downloaded documents. However, as long as the lowly ranked documents are not discarded or deleted completely, the user can still have a chance to differentially process the lower ranked documents after processing what this step has identified as the more relevant documents.

Alternatively, the procedure can go directly from step S1 to step S3, where all of the downloaded documents may be processed. If step S2 was chosen as an option, the user would further have the option in step S3 to process a portion of the documents at a time, starting with any rank, category or cluster the user should so choose, and iterating through the remaining groups if so desired. Assuming step S2 was not carried out, in step S3 a data mining tool, as described in U.S. application Ser. No. 10/033,823, or other data mining tool is used to mine relevant nouns and possibly relationships between these nouns. For example, in reading a scientific text document that says gene A upregulates gene B, the data mining tool can extract the nouns "gene A" and "gene B", as well as the verb or relationship "upregulates". For more complex language that must be interpreted to include that gene A upregulates gene B, this may still possibly be automatically accomplished using an NLP tool. In the worst case, using a lexicon of gene names (in general, a lexicon of "entity" names, which include genes, proteins, molecules, compounds, diseases, drugs, etc.), the nouns "gene A" and "gene B" can still be automatically extracted. After that the user can access those portions of the text that contain the extracted nouns, read those portions and make interpretations as to the relationships being described. After that, the user manually inputs the verbs or relationships. Alternatively, mining can be done independently of the query terms. For example, relevant data may be sets of all sentences that have a gene name and an interaction of interest identified by a verb of interest. In this was, a lexicon of nouns and verbs may be used to judge relevancy of sentences, and this may differ from the user's query terms.

After mining relevant data from each of the text documents the relevant data is input to a local format module as described in co-pending commonly assigned application Ser. No. 10/154,524, filed May 22, 2002 and titled "Systems and Methods for Extracting Pre-existing Data from Multiple Formats and Representing Data in a Common Format for Making Overlays" which is incorporated herein, in its entirety, by reference thereto. The local format module converts the relevant data to the local format at step S4. The local format is a much reduced expression of what may have appeared in the scientific text from which the relevant data was extracted. The local formatting, however, expresses the relevant data in a way that allows direct comparison of the User's data, which is also expressed in the local format, with the relevant data from the scientific text.

At step S5, the local format module further links the locally formatted data which was converted from the relevant data extracted from the scientific text, with any other information existing in the user's system in the local format that matches the converted scientific data. In this regard, it should be noted that the user's experimental data, or whatever data is desired to evaluate/compare with the scientific text data, has already been converted to the local format, either automatically, semi-automatically or manually, as described in co-pending, commonly owned application Ser. No. 10/154,524. However, if the user's data has not yet been converted, it can be converted to the local format after converting the scientific text data. In either case, after both datasets have been placed into the common local format, the linking is performed at step S5.

The links provide information that can be used in ranking, and otherwise discriminating the scientific textual data in a way that is directly related to the user's own experimental data or other data on the user's system. In this way, the results are much better tailored according to the context of what the user is searching for, not just according to the words of a query and comparison of scientific text documents against one another. For example, if a first scientific text document mentions both gene A and gene B in a mechanism relating to gene C, whereas a second scientific document relates to an upregulation of gene B by gene A, ranking and other ordering according to only a query regarding both genes A and B, and comparison among the scientific articles would rank articles 1 and 2 equally. However, if the user has experimental data which is directed to regulation of gene B by gene A, the present invention would rank scientific text article 2 much higher than article 1, since the locally formatting of article 2 would be linked to the local formatting of the user's experimental data, whereas article 1's local formatting may only be linked to the experimental data by the nouns (gene A, gene B) associated with the datasets, if linked at all.

In this way, a much more reliable ranking of the scientific text data can be performed. At step S6, the user is given the option to rank the scientific text articles (or subset of the articles if step S2 was carried out and the user wishes to process only a portion of the retrieved articles at one time) according to their relevance. Relevance rankings may be predicated upon the number of links that each particular document (or portion of a documents as described below) has with the user's data of interest. Thus, whenever genes, proteins or whatever entity or entities the experimental data is dealing with is mentioned, those documents that mention more of them are ranked higher than those with less mention. Further, the verbs that describe the experimental data and which are linked with verbs in the local formatting of a scientific document also contribute to the ranking score. In fact, the verbs may be given a different weighting factor than the nouns, if desired, so that they count differently towards the ranking of a scientific text document.

The ranking may be carried out on a per document basis, which can be selected at step S7, and when selected, the documents are ranked at step S8. As an alternative, the user may choose at step S7 to rank the material according to paragraphs of the textual data, or other smaller relevant portions of a document, such as sentences, or a predefined number of words around the relevant nouns or verbs in step S9. In this way, the present invention can more accurately hone in and identify a particular portion of a scientific text document which describes or relates to the data of interest. This option is particularly useful in situations where scientific article is relatively lengthy, but only a small portion of the article is relevant to the user's data. When a large number of documents are being ranked, and a large number of documents are similar in their relevance, this feature can also be useful and save a lot of time, allowing the user to go directly to the relevant information in each document.

It is further noted that the ranking procedures need not be exclusive of one another. That is, even after ranking by documents in step S8, the user can choose to further rank according to paragraphs or relevant portions of the documents as indicated by the dashed line between steps S8 and S9.

For example, if a user is looking at cancer and two particular genes, then if a scientific text talks about cancer and those 2 genes in a particular paragraph, that paragraph will be highly ranked, and can be brought up, even within the scientific text, using a viewer that selects the text according to the rankings. If the document containing the highly relevant text is large, e.g., a large journal article, then the user can save a great deal of browsing time by being able to zero in on the particular location of the relevant text within the large article. Those paragraphs which are most interesting (i.e., relevant, have more links to the experimental data) are ranked higher within the text than the other paragraphs.

As noted above, the ranking processing of the scientific text data is based on some rendition of the local context, which, in its simplest form, could be simply nouns and verbs. In such a situation, the user may have experimental data expressed in terms of nouns and verbs (e.g., local format). In ranking, the present invention uses a processing engine to process the nouns and verbs that represent the experimental data, and look for them in the scientific text documents. The scientific text documents, which may be numerous, are realigned by the processing engine which finds matches of the nouns and verbs in the scientific text. The ranking may be done according to document, according to relevant passages or paragraphs within documents, or according to document, with an additional ranking of paragraphs/passages within each document.

In step S10 the user can select any textual document or portion of a textual document if the ranking has the material broken down in this fashion for review on a viewer. Moreover, the user is given the option to overlay the experimental data that is linked with that particular textual material being reviewed, using any of a number of overlaying techniques described in co-pending and co-owned application Ser. No. 10/154,524 and Ser. No. 10/155,616, filed concurrently herewith and titled "System and Methods for Visualizing Diverse Biological Relationships", both of which are incorporated herein, in their entireties, by reference thereto. Visualizations of the relationships between the experimental data and the Scientific textual data can also facilitate manual relevance ranking of the Scientific text. For example, by overlaying experimental data on selected scientific text for direct comparison of the two, the user may discover that a textual document or excerpt rated below a second textual document or excerpt may describe some data or results which are actually more relevant to the user's experimental data than that of the more highly rated document or excerpt. In this situation, the user can manually change the ranking of one or both of such documents or excerpts to reflect his findings.

The overlaying process also affords the user the opportunity to compare the content of the experimental data versus the scientific literature and determine whether the experimental data concurs with the scientific text. If it does not, the user can annotate the experimental data to the effect that it is untrustworthy, needs revision, or the like. Or, there may be a situation where the experimental data concurs with several journal articles, but one journal article opposes the experimental findings. This alerts the user that a further investigation of not only the experimental data, but particularly the opposing scientific journal article may be in order. In this case, the user may label the opposing journal article as errant, less trustworthy, or something to that effect. It is further possible to set up a reliability scale, where the user could label supporting and opposing data on a sliding scale as to it's reliability. This could be used by others on the user's team as well as the user and aid them in letting them know in advance how reliable each document is.

At step S11, or if the user decides not to rank the data at step S6, the procedure goes to step S20, where the user is given the opportunity to filter the data. Filtering can be an extremely useful tool in situations where the user wants to more specifically examine only a portion of the experimental data that is linked with the scientific textual documents. For example, if the experimental data contains experiments and relationships regarding genes A, B,C and D, the user may be interested only in examining relationships between genes A and B at that moment. Even if a general query is done specific to only genes A and B, some of the scientific journal articles may also contain information regarding gene C and/or gene D, even if only incidentally. In such a situation, the local format module could form links between the local formatting of the experimental data pertaining to genes C and D and the description of these genes in the scientific text articles.

In order to filter out the extraneous data regarding genes C and D, the user can select a subset of the local formatting of the experimental data at step S26. In this instance, for example, the user could select to process only genes A and B and the relationships therebetween. Then the processing engine processes that subset of the local formatting of the experimental data against the local formatting of the scientific text documents at step S26. If there were documents relating only to gene C or to gene D or to genes C and D, these documents will be filtered out as a result of the processing at step S26. At step S28, there is another opportunity to rank the remaining documents. It is likely that the ranking of the remaining documents will have changed with respect to one another even if they have been previously ranked due to the change in ranking criteria. The ranking of these results can be performed by returning to step S7.

In the alternative, the user may wish to access and review the filtered documents at step S30 without any further ranking. This may be particularly preferred when the documents have already been previously ranked, although this option can also be chosen if the documents have not been previously ranked. As described above with regard to the ranking processing, at step S30 the user can select any textual document or portion of a textual document if the ranking has the material broken down in this fashion for review on a viewer. Moreover, the user is given the option to overlay the experimental data that is linked with that particular textual material being reviewed, using any of an number of overlaying techniques described in co-pending and commonly assigned applications Ser. No. 10/154,524 and Ser. No. 10/155,616, filed concurrently herewith. Visualizations of the relationships between the experimental data and the scientific textual data can also facilitate manual relevance ranking or filtering out of scientific text that is not relevant.

When the user is finished viewing and/or overlaying the documents identified by the filtering process, or if the user decides to further categorize the identified text, the process goes to step S40 for categorization. Likewise, should the user decide not to filter at step S22, the process is advanced to step S40 where the user is given the option of categorizing.

Before describing the categorization processing however, back at step S22 the user is given may optionally decide at step S24 to filter based upon a subset of the scientific text documents that were retrieved by the query. This step may be performed in addition to identifying a subset of the experimental data at step S22, or as an alternative to identifying a subset of the experimental data, in which case the user could simply input the entire set of experimental data at step S22. The identification of a subset of the scientific documents, or excerpts thereof may be a particularly appealing option when a ranking process has already been performed on the scientific text documents, either according to the documents as a whole, paragraphs or excerpts of the documents, or paragraphs or subsets of the documents ranked within the documents which have also been ranked according to whole documents. In any of these situations, it might be readily apparent to a user that one or more documents or excerpts, which may be ranked low, are not very relevant to the task at hand. By selecting all of the documents or excerpts other than these particularly non-relevant ones at step S24, the process can then proceed to step S26, having already filtered out a certain amount of the textual document.

At step S40, the user is given the option to categorize the results of the scientific text documents. At this stage, the text documents may or may not have been ranked according to any of the procedures described above, may or may not have been filtered according to any of the procedures described above, or any combination of those. That is, the mined data may be directly processed at step S40 by way of steps S6 and S20, ranked only documents may be processed at step S40 by way of steps S11 and S20, ranked and filtered documents may be processed at step S40 by way of steps S11, S20 and S32, filtered only documents may be processed at step S40 by way of steps S6, S20 and S32, and other combinations of the data processed through various routes of the flow chart may be processed at step S40.

If the user decides to categorize the text data, subsets of the local formatting of the experimental data are defined in "buckets" at step S42. That is, one subset of nouns and/or verbs taken from the local formatting of the experimental or local data are chosen for bucket one, another subset of nouns and/or verbs taken from the local formatting of the experimental or local data are chosen for bucket two, and so forth. The nouns and/or verbs in each bucket may be completely distinct from one another, or they may have overlap. Using the example given above wherein the experimental data relates to genes A, B, C and D, bucket one may contain "A upregulates B", for example, while bucket two could contain "B upregulates D" and so forth.

In this way, the processing engine, at step S44 can then individually process the local formatting of each bucket with respect to the textual data. What results is a set of textual documents or excerpts with respect to each bucket, which is relevant to that bucket, respectively. At step S46, the user can select any of the bucket results to selectively browse the results for the bucket that he is interested in at the time, with an option to overlay the experimental data over the results in the same manner described above with regard to steps S10 and S30. After selectively browsing one set of results, the user can select another set of results relating to a second bucket and so forth.

In addition to manually annotating results with regard to any of the buckets, as to reliability, ranking, etc., as described above, after browsing results relating to a bucket and/or overlaying and comparing experimental data therewith, the user may decide that further processing is in order. At step S48, the user is given the option to rank one or more of the result categories corresponding to the defined buckets. If the user chooses to do a further ranking procedure the processing returns to step S7. If the user chooses not to rank, the user is then given an option to do filtering at step S50. If the user chooses to filter one or more of the result categories corresponding to the defined buckets, then the processing is returned to step S22. If the user chooses not to filter any of the results, the process ends.

Referring back to step S40, should the decision be made not to categorize, the user is given the option to rank at step S60. If the user chooses to rank, the process goes to step S7. If the user chooses not to rank, the process ends.

Each of the tools according to the present invention enhances the user's ability to identify textual documents relevant to the local data that the user is working on and developing. These tools and processes, by enabling the user to better identify the context of what he is searching for, and then to compare the local data with highly relevant data downloaded or otherwise obtained from an existing database, optionally thorough the additional aid of overlaying one over the other, can help user to judge relevance of different types of data. For example, if a scientific text document says "A upregulates B", but the user's experimental data says that "A does not upregulate B", the user is, at a minimum, alerted to the fact that there is a discrepancy. While sometimes the user might want to rely on the journal article as being correct, this might not always be the case. The user may be motivated to repeat the experiments, and compare those results. Other actions may be taken by the user to determine validity, for example, the user may alter a hypothesis such that the apparent discrepancy is accounted for. Or, after further experimentation the user may determine that the scientific text document is inaccurate and take steps either to annotate this, for internal use, that it is not reliable, or to contact the author and have the text document retracted or modified.

Thus, the present invention also allows validation and ranking of identified text documents as to their reliability/validity, and the same ability for characterizing the user's experimental data. That is the results of the present tools permit further human judgment as to what data is reliable or valid. Values may be assigned on a sliding scale or on a binary scale (i.e., valid/invalid) to characterize the validity, reliability or trustworthiness of data as well as scientific text documentation. This documentation of values may be attached or linked to the documents/experimental data in the local formatting of the same so that each time further data is linked with the existing locally formatted data, these annotations/documentations will alert the user as to the judgments that have been made previously.

The present invention is not limited to the processing of textual documents with respect to the user's locally stored data, but the same processes may be applied to biological models as well as other experimental data sets. However, in the case of biological models, it is currently more difficult to import biological models (such as pathways, for example) than it is textual documents. Therefore, a complete automatic conversion of such a biological model to the local format occurs less frequently than an automatic conversion of a textual document. Nonetheless, biological models can often be semi-automatically converted, where some or all of the nouns identified in the model or pathway may be automatically converted, but where a user must analyze the pathway or model to determine the interrelationships between these nouns and manually enter some or all of the verbs.

Thus, although the query and data mining steps with regard to a biological model may be somewhat different or more difficult than with respect to textual data (steps S1, S2 and S3), the remaining process steps described above for ranking, filtering and categorizing of biological model data can be carried out in the same way once the biological models have been converted to local formatting (although the local format conversion may be more difficult, as noted). With regard to categorization, different pathways or models, or portions thereof, may be categorized in different buckets much in the same way as textual documents are treated.

By overlaying experimental data over various pathways, a determination can be made as to which pathway(s) is/are more relevant to the experimental data.

As an example, a user may be working with a gene A and has experimental data regarding the same. A query performed from one or more biological databases for all pathways in which gene A is involved may return 10 or 20 different pathways; for example. Some of these pathways may be characterizing gene A's role in mechanisms in the heart tissue, some may be with regard to gene A's relevance in the liver cells, and some may relate to breast tissue. If the user is currently researching breast cancer, he may choose to filter for breast cancer pathway, and therefore select nouns and/or verbs (at step S22) from the locally formatted experimental data that are selective for the breast cancer pathways.

The filter process will then automatically find those pathways that are involved in breast cancer and rank them higher, or eliminate the non-selected (irrelevant pathways to breast cancer) altogether. If the experimental data pertains only to breast cancer and the local format contains nouns or verbs exclusive to the same, then the ranking procedures (step S7 and S9) will rank the breast cancer pathways higher, and the other pathways will likely not be eliminated (since they will link at least with the noun "gene A"), but they will be ranked lower.

If the user had data with regard to both breast cancer and heart tissue, then a categorization process could be carried out (step S40+) wherein the user could define a first bucket containing gene A and other nouns/verbs exclusive to breast cancer, while defining a second bucket containing gene A and other nouns/verbs exclusive to heart tissue. The process would then automatically distribute the breast cancer pathways to bucket one and the heart tissue pathways to bucket 2.

Ranking, filtering and categorization of an existing data set of experimental data vis a vis the user's current set of experimental data or other locally stored data can also be performed using the system tools and processes according to the present invention. Particularly if the existing data set is of the same format, it is straightforward to convert this data to the local format in the same way that the user's data is converted. If the existing data set is of a different format, conversion to local formatting can still be accomplished, as described in more detail in application Ser. No. 10/164,524.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, data type, network, user need, process, process step or steps, to the objective, spirit and scope of the present invention. All such modifications are intended to be within the scope of the claims appended hereto.

That which is claimed is:

1. A method of facilitating identification and organization of new information that is relevant to the context of a users locally stored information, the method comprising the steps of:

extracting relevant data from a first data set;

converting the relevant data from the first data set to a local format;

linking the relevant data in the local format with locally formatted data from a second data set which is locally stored and which matches the relevant data; and comparing data from the first data set that is relevant to the locally stored data set, based on links set up by the linking of data in the local format.

2. The method of claim 1, wherein the locally stored data set is experimental data.

3. The method of claim 1, further comprising the step of ranking the relevant data based on the number of links established between each instance of locally formatted relevant data and the locally stored, locally formatted data, relative to the number of links established between other instances of locally formatted relevant data and the locally stored, locally formatted data.

4. The method of claim 3, wherein the first data set comprises textual documents, each instance is contained within a textual document, and the ranking is performed on an entire document basis.

5. The method of claim 4, further comprising the step of further ranking the relevant data within each document.

6. The method of claim 3, wherein the first data set comprises textual documents, each instance is contained within a textual document, and the ranking is performed on a basis of relevant paragraphs or passages of text.

7. The method of claim 3, wherein the first data set comprises biological models, and the ranking is performed on a basis of entire models.

8. The method of claim 3, wherein the first data set comprises biological models, and the ranking is performed on a basis of relevant portions of the biological models.

9. The method of claim 3, wherein the first data set comprises experimental data, and the ranking is performed on a basis of portions of the experimental data.

10. The method of claim 1, wherein the step of comparing includes overlaying data from the locally stored data set on the first data set, or vice versa.

11. The method of claim 1, further comprising the steps of:

identifying a subset of the locally formatted data from the second data set which is locally stored;

linking the relevant data in the local format with subset of the locally formatted data from the second data set which is locally stored and which matches the relevant data;

and filtering the first data set, based on the links formed by linking the relevant data in the local format with the subset of the locally formatted data from the second data set which is locally stored, thereby identifying a subset of the first data set.

12. The method of claim 11, wherein the first data set comprises textual documents, end the subset is defined on an entire document basis.

13. The method of claim 11, wherein the first data set comprises textual documents, and the subset is defined by selecting one or more paragraphs or portions of at least one of the textual documents.

14. The method of claim 11 wherein the first data set comprises biological models, and the subset is defined on a basis of entire models.

15. The method of claim 11, wherein the first data set comprises biological models, and the subset is defined on a basis of relevant portions of the biological models.

16. The method of claim 11, wherein the first data set comprises experimental data, and the subset is defined on a basis of portions of the experimental data.

17. The method of claim 11, further comprising the step of comparing data from the subset of the first data set that is relevant to the locally stored data set, based on links set up by the linking of data in the local format.

18. The method of claim 17, wherein the step of comparing data from the subset of the first data set that is relevant to the locally stored data set, includes overlaying data from the locally stored data set on the subset of the first data set, or vice versa.

19. The method of claim 1, further comprising the steps of:
defining multiple subsets of the locally formatted data from the second data set which is locally stored which correspond to buckets; and
linking the relevant data in the local format with each of the subsets of the locally formatted data from the second data set which is locally stored and which matches the relevant data; and
categorizing the first data set, based on the links formed by linking the relevant data in the local format with the subsets of the locally formatted data from the second data set which is locally stored, wherein portions of the first data set having links to a particular subset of the locally formatted, locally stored data set are categorized in the bucket which corresponds to that subset, respectively.

20. The method of claim 19, wherein the first data set comprises textual documents, and the categorizing is performed on an entire document basis, such that the portions of data allocated to the buckets are in the form of entire documents.

21. The method of claim 19, wherein the first data set comprises textual documents, and the categorizing is performed on a basis of relevant paragraphs or passages of text from the textual documents, such that the portions of data allocated to the buckets are paragraphs or passages of text.

22. The method of claim 19, wherein the first data set comprises biological models, and the categorizing is performed on a basis of entire models, such that the portions of data allocated to the buckets are in the form of entire models.

23. The method of claim 19, wherein the first data set comprises biological models, and the categorizing is performed on a basis of relevant portions of entire models, such that the portions of data allocated to the buckets are in the form of portions of the models.

24. The method of claim 19, wherein the first data set comprises experimental data, and the categorizing is performed on a basis of portions of the experimental data, such that the portions of data allocated to the buckets are in the form of portions of the experimental data.

25. The method of claim 19, further comprising the step of selectively browsing at least one of the buckets.

26. The method of claim 1, wherein the step of comparing comprises overlaying at least one item of data from the locally stored data set on the first data set, or vice versa, which supports the data on which it is overlayed.

27. The method of claim 1, wherein the step of comparing comprises overlaying at least one item of data from the locally stored data set on the first data set, or vice versa, which opposes the data on which it is overlayed.

28. The method of claim 1, wherein the step of comparing comprises differentially overlaying at least one item of data from the locally stored data set on the first data set, or vice versa, which supports the data on which it is overlayed, in addition to overlaying at least one item which opposes the data on which it is overlayed.

29. A method of identification and organizing new information that is relevant to the context of a user's locally stored information, the method comprising the steps of:
retrieving data resultant from a query of one or more databases;
mining the data to extract relevant data;
converting the relevant data from the first data set to a local format;
linking the relevant data in the local format with locally formatted data from a local data set which matches the locally formatted relevant data; and
ranking the data based on a number of links established between the locally formatted relevant data and the locally formatted local data.

30. The method of claim 29, further comprising the steps of:
identifying a subset of the locally formatted local data;
linking the relevant data in the local format with the subset of the locally formatted local data; and
filtering the data, based on the links formed by linking the relevant data in the local format with the subset of the locally formatted local data.

31. The method of claim 29, further comprising the steps of:
defining multiple subsets of the locally formatted local data;
assigning a bucket to each subset, respectively;
linking the relevant data in the local format with each of the subsets of the locally formatted local data which matches the relevant data;
and categorizing the data, based on the links formed by linking the relevant data in the local format with the subsets of the locally formatted local data, wherein portions of the data having links to a particular subset of the locally formatted, local data are categorized in the corresponding bucket, respectively.

32. The method of claim 31, further comprising the step of selectively browsing at least one of the buckets.

33. A method of identifying data relevant to the context of a user's local data, the method comprising:
retrieving data resultant from a query of at least one scientific text database or biological model database;
mining the data to extract relevant data;
converting the relevant data from the first data set to a local format;
linking the relevant data in the local format with locally formatted data from a local data set which matches the locally formatted relevant data; and
organizing the relevancy of the data based on a number of links established between the locally formatted relevant data and the locally formatted local data.

34. The method of claim 33, wherein the step of organizing includes ranking the data.

35. The method of claim 33, wherein the step of organizing includes filtering the data.

36. The method of claim 33, wherein the step of organizing includes categorizing the data.

37. A system for identifying data relevant to the context of a user's local data, the method comprising:
means for retrieving data resultant from a query of at least one scientific text database or biological model database;
means for mining the data to extract relevant data;
means for converting the relevant data from the first data set to a local format;
means for linking the relevant data in the local format with locally formatted data from a local data set which matches the locally formatted relevant data; and
means for organizing the relevancy of the data based on a number of links established between the locally formatted relevant data and the locally formatted local data.

38. The system of claim 37, wherein said means for organizing includes means for ranking the data.

39. The system of claim 37, wherein said means for organizing includes means for filtering the data.

40. The system of claim 37, wherein said means for organizing includes means for categorizing the data.

41. The system of claim 37, further including means for selectively browsing the organized data.

42. An application for ranking data retrieved from one or more scientific text databases or biological model databases, said application comprising:
means for converting relevant data extracted from the data to a local format;
means for linking the locally formatted relevant data with locally formatted local data of a user of the application; and
means for ranking the relevancy of the data based on a number of links established between the locally formatted relevant data and the locally formatted local data.

43. An application for filtering data retrieved from one or more scientific text databases or biological model databases, said application comprising:
means for converting relevant data extracted from the data to a local format;
means for linking the locally formatted relevant data with a subset of locally formatted local data of a user of the application; and
means for filtering the data based on a number of links established between the locally formatted relevant data and the subset of the locally formatted local data.

44. An application for categorizing data retrieved from one or more scientific text databases or biological model databases, said application comprising:
means for converting relevant data extracted from the data to a local format;
means for linking the locally formatted relevant data with subsets of locally formatted local data of a user of the application; and
means for categorizing the data based on a number of links established between the locally formatted relevant data and each of the subsets of the locally formatted local data.

45. A computer readable medium carrying one or more sequences of instructions from a user of a computer system for identifying data relevant to the context of a user's local data, wherein the execution of the one or more sequences of instructions by one or more processors cause the one or more processors to perform the steps of:
converting relevant data extracted from the data to a local format;
linking the locally formatted relevant data with locally formatted local data of the user which matches the locally formatted relevant data; and
organizing the relevancy of the data based on a number of links established between the locally formatted relevant data and the locally formatted local data.

46. The computer readable medium of claim 45, wherein the step of organizing includes ranking the data.

47. The computer readable medium of claim 45, wherein the step of organizing includes filtering the data.

48. The computer readable medium of claim 45, wherein the step of organizing includes categorizing the data.

49. The computer readable medium of claim 45, wherein the following further step is performed:
selectively browsing the organized data.

50. The computer readable medium of claim 45, wherein the following further step is performed:
mining the data to extract the relevant data.

51. The computer readable medium of claim 50, wherein the following further step is performed:
retrieving the data as a result of a query of at least one scientific text database or biological model database.

52. The computer readable medium of claim 45, wherein the following further step is performed;
overlaying at least a portion of the locally stored data on at least a portion of the data, or vice versa.

* * * * *